J. P. JAKOBSEN & G. O. KREBS.
GEARING.
APPLICATION FILED NOV. 22, 1912.

1,128,147. Patented Feb. 9, 1915.

UNITED STATES PATENT OFFICE.

JAKOB PETER JAKOBSEN, OF COPENHAGEN, AND GEORG OTTO KREBS, OF HELLERUP, NEAR COPENHAGEN, DENMARK.

GEARING.

1,128,147.     Specification of Letters Patent.     Patented Feb. 9, 1915.

Application filed November 22, 1912. Serial No. 732,870.

*To all whom it may concern:*

Be it known that we, JAKOB PETER JAKOBSEN and GEORG OTTO KREBS, subjects of the King of Denmark, residing at 80 Vesterbrogade, Copenhagen, Denmark, and 13 Ahlmanns Allé, Hellerup, near Copenhagen, Denmark, respectively, have invented new and useful Improvements in Gearing, of which the following is a specification.

The invention refers to price indicating meters for electricity, gas, water, etc., which may be adjusted, by substituting one gearwheel for another one, corresponding to any system of money or measure for the merchandise consumed and any rate of payment for the latter.

The invention consists in a device, enabling such arrangement or modification of the meter to be effected in an especially simple and secure manner. The distinguishing feature of this arrangement is that the above mentioned interchangeable wheel whose number of cogs corresponds to the rate is firmly and co-axially connected with another wheel whose size (number of teeth) is the same for all such sets of gear-wheels and corresponds to the fundamental number of the system of coinage (for dollars: 100), the shaft of the set of gear-wheels having its bearings in a turnable arm, easy to fix in position and having its axis of rotation coincident with that of the pinion, engaging the larger gearwheel of the set. This arrangement renders it possible to exchange the set of wheels easily and quickly, without touching the meter shaft or the indicator shaft.

Figure 1:
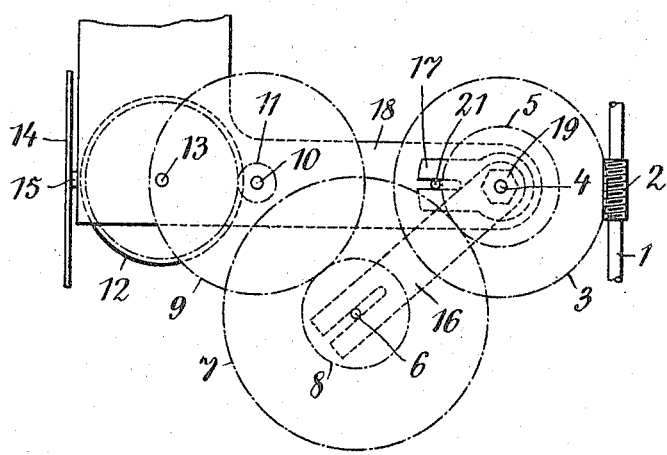
Figure 2:
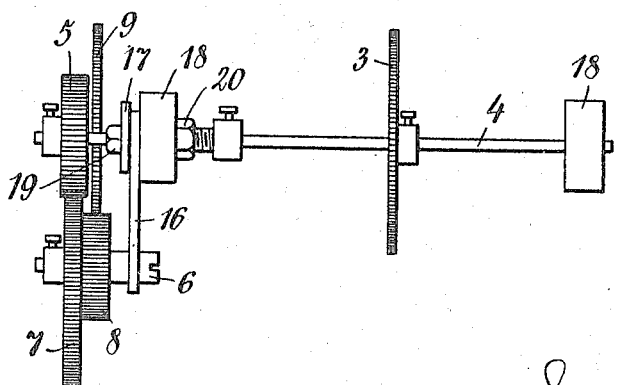

On the drawing, the invention is illustrated as applied to an electricity meter, and Figure 1 shows, in outline, this manner of execution, Fig. 2 a fragment of the same, in side elevation.

1 is the meter- or motor-shaft, in the manner of execution shown here fitted with a worm 2, engaging a corresponding worm-wheel 3 with shaft 4. On this shaft a smaller wheel 5 is fastened, engaging the exchangeable set of gear-wheels, 7, 8, fastened on a common shaft, and having for instance 100 and 40 teeth respectively. The smaller wheel 8, the "rate-wheel", corresponding to the rate, engages a wheel 9, provided on a shaft 10 carrying also the counting-mechanism's pinion 11, engaging the counting-mechanism's gear-wheel 12 on the counting-mechanism's shaft 13.

14 indicates the window in front of the counter, and 15 openings therein for reading the indications. The exchangeable set of wheels 8, 7 is pivoted in the arm 16, rotatable about the shaft 4 or one or more journals co-axial with this shaft. Alongside of the arm 16 there is provided a disk 17 with a slot, fitting around a pin 21, firmly fastened to the frame 18, so that the disk 17 cannot rotate about the shaft 4. The disk 17, the arm 16 and the arm 18 of the frame are firmly fastened together by means of a screw-bolt 19 with nut 20 (Fig. 2), and the shaft 4 rests in an axial bore in the bolt 19. By this construction it is attained that the nut 20 may be tightened firmly on the screw-bolt 19, without the arm 16 having then the slightest tendency to alter its position, a feature greatly facilitating a correct adjustment of the gear-wheels in relation to one another. By a simple rotation of the arm 16, the wheels 7 and 8 may thus be made to engage the wheels 5 and 9 respectively, entirely without regard to the diameter (or number of teeth) of the rate-wheel 8, as the wheel 7 has the same diameter (number of teeth) in all the sets of wheels.

When it is desired, in a meter of this construction, to change the rate for instance from 10 cents per kilowatt-hour to 3 3/4 cents per kilowatt-hour, the arm 16 is swung out to one side, and instead of the set of wheels 7, 8 another one is inserted, the rate-wheel thereof having 15 teeth of the same pitch as the wheels 7 and 8, while the new wheel is exactly similar to the wheel 7, and by rotation of the arm 16, the wheel 8 is then made to engage the wheel 9. Then the arm 16 is fastened in its position by the nut 20 being tightened.

Having now particularly described and ascertained the nature of our said invention, and in what manner the same is to be performed, we declare that what we claim is:—

1. In a price indicating meter, the combination with the pinion 5 and its shaft 4, of the exchangeable set of wheels 7, 8, said wheels being rigidly and coaxially connected together, another gear wheel 9, a shaft 6 upon which said set of wheels is rotatably supported, an arm carrying said shaft and mounted for angular adjustment about the shaft 4 and operating to maintain the wheel 7 in mesh with said pinion and to bring wheel 8 into mesh with wheel 9, and means for rigidly holding said arm in its adjusted position.

2. In a price indicating meter, the combination with the pinion 5 and its shaft 4, of the exchangeable set of wheels 7, 8, having a different number of teeth, and being rigidly and coaxially connected together; another gear wheel 9 a shaft 6 upon which said set of wheels is rotatably supported, an arm carrying said shaft and mounted for angular adjustment about the shaft 4 and operating to maintain the wheel 7 in mesh with said pinion and to bring wheel 8 into mesh with wheel 9, and means for rigidly holding said arm in its adjusted position.

The foregoing specification signed at Copenhagen this 9th day of November, 1912.

JAKOB PETER JAKOBSEN.
GEORG OTTO KREBS.

In presence of—
ORR GIERSING,
JULIUS LEHMANN.